J. O'H. CARSON.
APPARATUS FOR TEACHING GEOMETRY.
APPLICATION FILED NOV. 11, 1915.
1,250,796.
Patented Dec. 18, 1917.
3 SHEETS—SHEET 1.
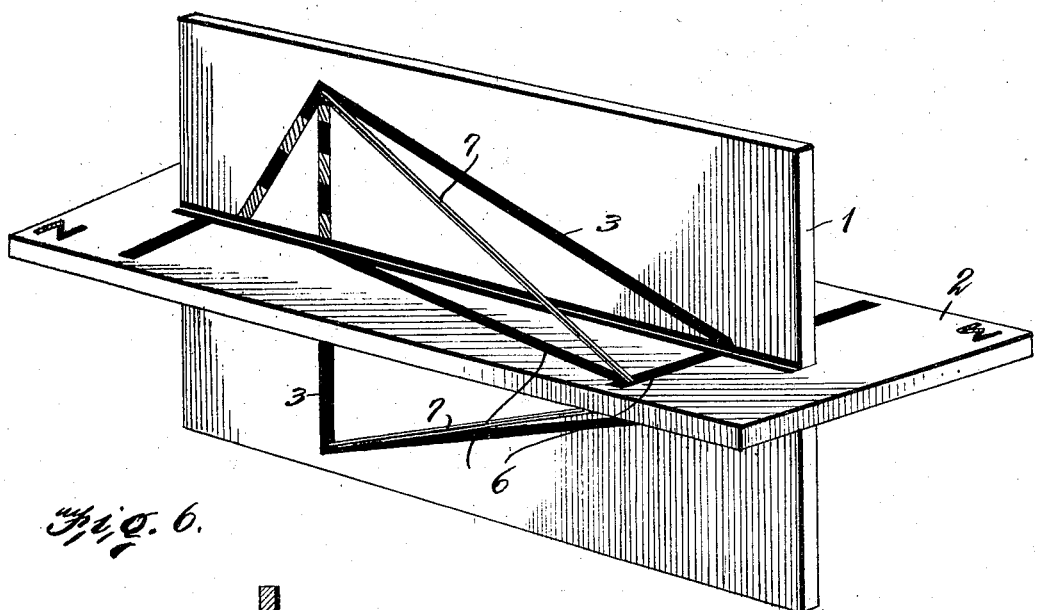
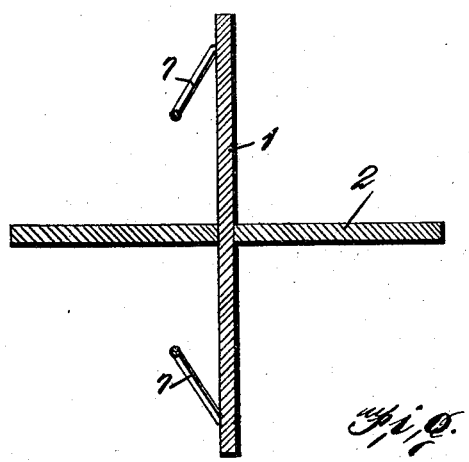
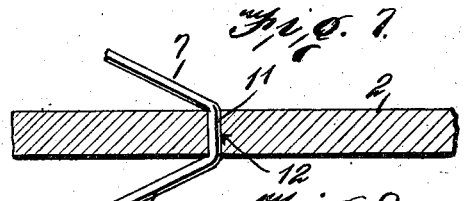
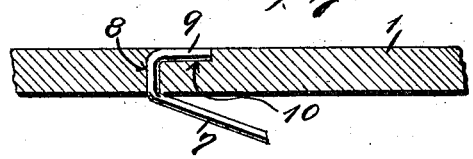
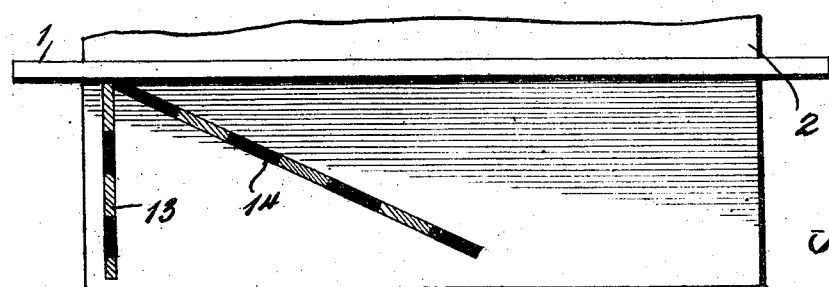
Inventor
J. O. Carson.

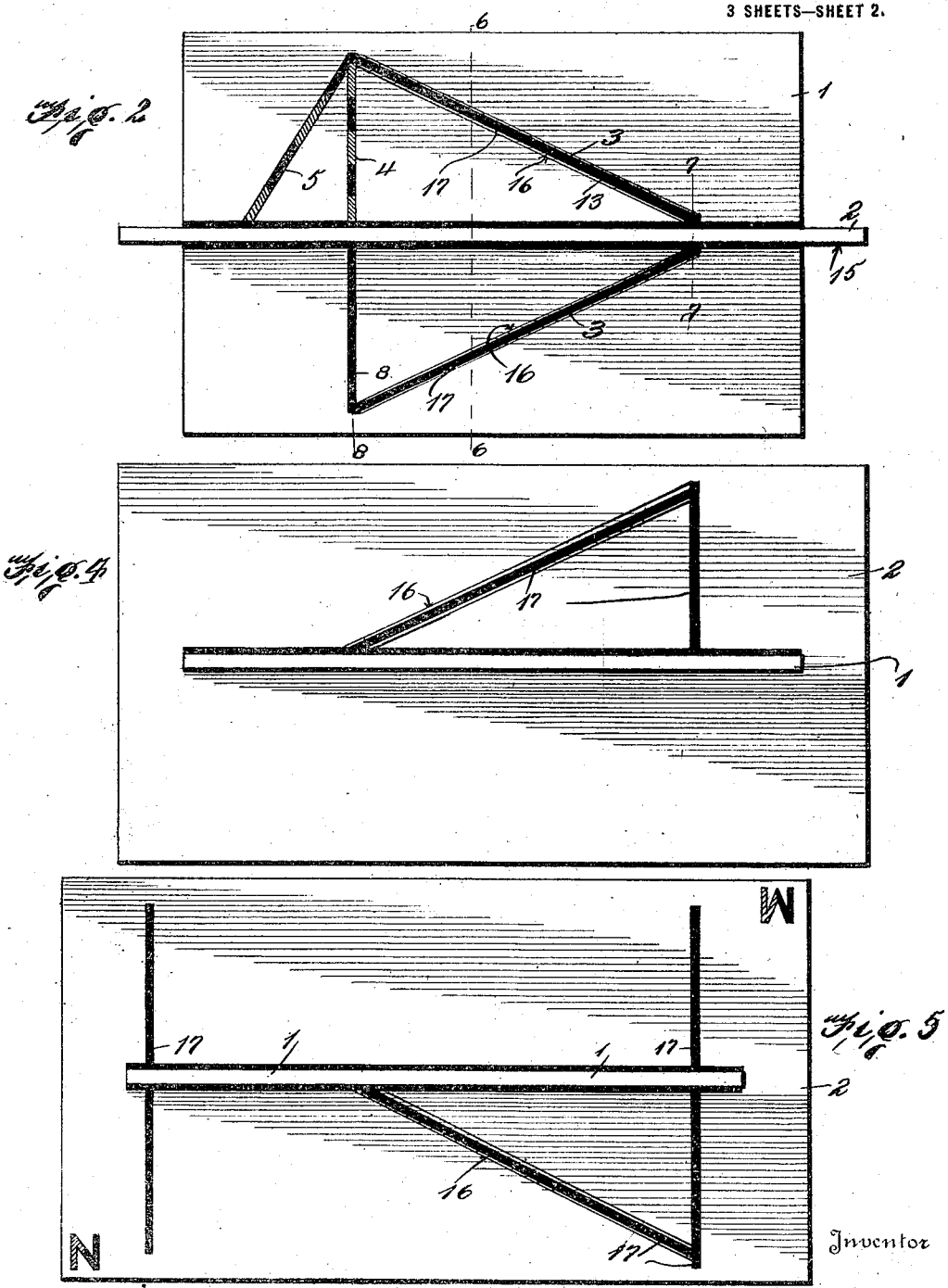

J. O'H. CARSON.
APPARATUS FOR TEACHING GEOMETRY.
APPLICATION FILED NOV. 11, 1915.
1,250,796.
Patented Dec. 18, 1917.
3 SHEETS—SHEET 3.
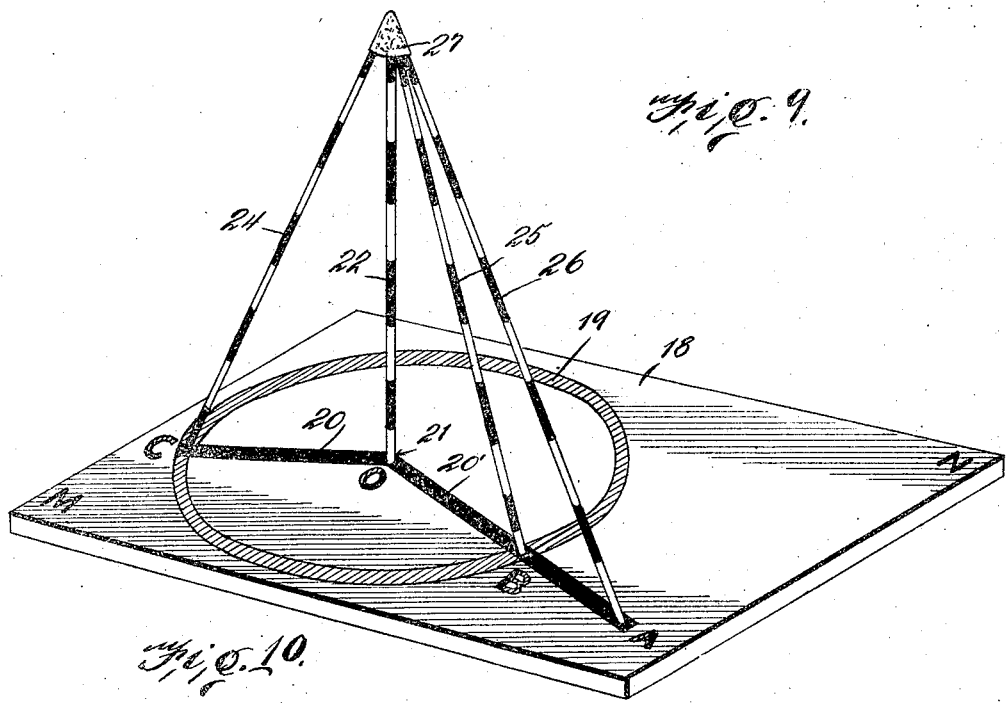
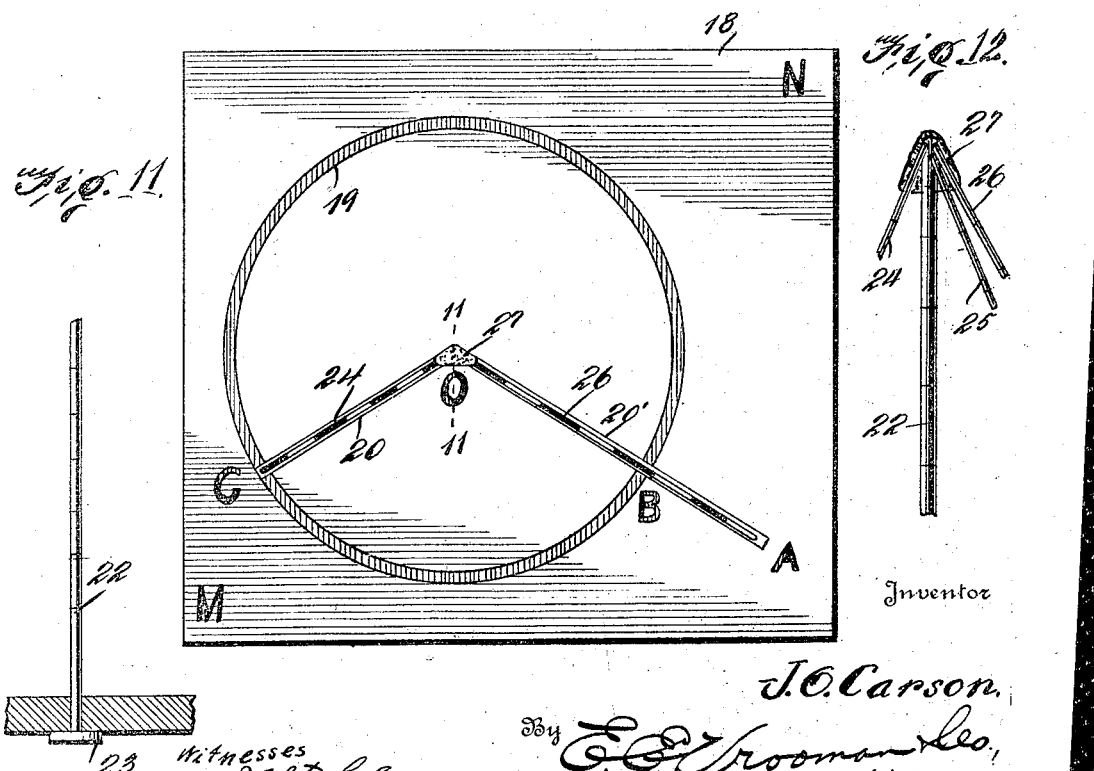

UNITED STATES PATENT OFFICE.

JOSEPH O'HARA CARSON, OF NEW ORLEANS, LOUISIANA.

APPARATUS FOR TEACHING GEOMETRY.

1,250,796.

Specification of Letters Patent. Patented Dec. 18, 1917.

Application filed November 11, 1915. Serial No. 60,938.

*To all whom it may concern:*

Be it known that I, JOSEPH O'HARA CARSON, a citizen of the United States of America, residing at New Orleans, in the parish of Orleans and State of Louisiana, have invented certain new and useful Improvements in Apparatus for Teaching Geometry, of which the following is a specification, reference being had therein to the accompanying drawing.

This invention relates to means for facilitating the teaching of geometry and has for its object the provision of means for assisting a pupil to comprehend the construction of any geometrical figure wherein lines and planes are employed.

In teaching geometry it has been found very difficult to have children imagine or visualize figures of a number of different dimensions when drawn upon a flat blackboard. By means of the structures claimed, all lines and planes are in their correct positions, thereby permitting the problem illustrated to be readily grasped by the student.

Another object of this invention is the production of an efficient means of illustrating the construction of geometrical figures.

With these and other objects in view, this invention consists of certain novel combinations, constructions, and arrangements of parts, as will be hereinafter fully described and claimed.

In the accompanying drawings:—

Figure 1 is a perspective view of the apparatus used in demonstrating two simple geometrical problems.

Fig. 2 is a side elevation of the structure shown in Fig. 1.

Fig. 3 is a fragmentary side elevation of the opposite side of the device as shown in Fig. 2.

Fig. 4 is a bottom plan view of the structure shown in Fig. 2.

Fig. 5 is a top plan view of the structure shown in Figs. 1 and 2.

Fig. 6 is a section taken on line 6—6 of Fig. 2.

Fig. 7 is a section taken on line 7—7 of Fig. 2.

Fig. 8 is a section taken on line 8—8 of Fig. 2.

Fig. 9 is a detailed perspective of an embodiment of the apparatus which may be used for demonstrating the construction of certain geometrical figures.

Fig. 10 is a top plan view of the structure illustrated in Fig. 9.

Fig. 11 is a vertical section taken on line 11—11 of Fig. 10.

Fig. 12 is a vertical section through the central vertical rod of the structure shown in Fig. 9, showing the manner in which the radiating wires or rods are connected therewith.

Referring to the accompanying drawings by numerals it will be seen that the structure illustrated in Figs. 1 to 8 inclusive comprises a vertically extending panel 1 constituting one plane and a longitudinally extending panel 2 constituting a second plane extending at right angles to the first-mentioned plane. These panels 1 and 2 are arranged to constitute a substantially cross-shaped figure in cross section so as to produce a plane at right angles upon each side of the demonstrating apparatus. It will be seen by considering Fig. 1 that the ends of the plane or panel 2 terminate short of the ends of the panel 1 for permitting the apparatus to be conveniently handled and easily reversed when so desired.

It should be understood that the apparatus herein illustrated, described, and claimed, may be made of any suitable material and size without departing from the spirit of the invention and that any desired detailed mechanical changes may be made so long as the device is confined to the scope of the appended claims. In Fig. 2, upon the upper panel 1, there is illustrated the following proposition:—"Through a given external point there can be drawn one line perpendicular to a given plane, and only one."

In illustrating geometrical figures and for the purpose of making the proposition clear to a student or pupil, construction lines are indicated in a solid color such as in Fig. 1 and indicated by the numeral 3. It of course should be understood that any suitable or convenient color may be used such as green, to indicate these construction or given lines. All conclusions to be proved or lines to be proved are indicated by a different color so as to be readily distinguished from the construction lines, the color being employed preferably being red or some other suitable color which may be easily distinguished. In Fig. 2 the line 4 which indicates the vertical line to be proved is painted or indicated with alternate colors so as to indicate that said line is to be used both as a line of conclusion to be proved and as a construction line for indicating certain other geometrical problems. A line is indicated upon the upper panel 1 by the numeral 5 which extends at an angle to the vertical line 4 being indicated by alternate colors, thereby illustrating that said line 5 may be used either as a conclusion to be proved or as a construction line. Attention is especially called to Fig. 1 wherein certain construction lines indicated by the numeral 6 are painted or otherwise formed upon the upper face of the panel 2 for indicating certain geometrical figures. As previously explained, it has been found very difficult to have children imagine or visualize certain lines constituting a portion of a certain figure desired to be formed and for this reason these imaginary lines as indicated by the numeral 7 are formed of wire, string, or other suitable material so that the same may be readily distinguished from those lines which are otherwise formed upon the flat faces of the several planes 1 and 2.

In the embodiment illustrated in the drawings, the imaginary line indicated by the numeral 7 is preferably formed of stiff wire or metal strips having the end portions thereof passing through the apertures 8 formed in the plane 1 and having the ends thereof bent backwardly to produce an angularly extending foot 9 fitting in a contact 10 formed upon the rear face of the plane 1 so as to efficiently hold the wire 7 in engagement with the plane.

The wire or strip 7 extends downwardly at a desired angle and passes through the plane 2 near the outer side edge thereof, as clearly illustrated in Fig. 7, the wire or strip being provided with a transversely extending straight portion 11 passing through the aperture 12 formed in the plane 2. The wire 7 is then bent rearwardly and extends at an opposite angle to the wire upon the opposite side of the plane 2 and has its outer end secured to the bottom portion of the plane 1 near the outer end thereof in a similar manner to that described in Fig. 8.

For the purpose of illustrating further problems which may be indicated upon the apparatus used, and the method employed, attention is invited to Fig. 3, illustrating the following proposition: "Through a given point in a plane there can be drawn one line perpendicular to the plane, and one only." It will be seen by referring to Fig. 3 that two lines indicated by the respective numerals 13 and 14 are indicated upon the face of the plane 1, these lines being capable of being used either as construction lines or lines to be proved. It will be seen that the line 13 extends at right angles to the outer face of the plane 2 and the line 14 extends at an intermediate angle of suitable degree with respect to the line 13 and the outer face of the plane 2.

By referring to Fig. 4 it will be seen that a view is indicated showing the lines formed upon the bottom face 15 of the plane 2 wherein the imaginary line 16 is indicated and short construction lines 17 are employed for indicating certain geometrical figures.

It of course should be understood that the board or apparatus used may have the usual lettering employed thereon such as the letters "M" and "N" as is usual in indicating certain geometrical propositions and indicating different sides of the apparatus.

Fig. 5 indicates one of the geometrical problems which may be drawn or formed upon the apparatus employed in carrying out the method of teaching the geometrical construction of certain figures.

In Figs. 9 to 12 inclusive, there is shown an embodiment of the invention wherein a base 18 is employed having the circle 19 formed upon the upper face thereof for indicating the construction line employed and a plurality of diverging lines 20, 20' are drawn through the circle 19 extending from the axis 21 of the circle. A vertically extending standard 22 passes through the base 18 and is provided with an enlarged head 23 for constituting a bracing means for the vertically extending standard 22. An angularly extending rod 24 extends from the outer end of the line 20 to the top or apex of the vertical rod 22 and a second diverging rod 25 extends from the point of junction between the circle 19 and the line 20' and also extends to the apex of the rod 22. A third line 26 is employed extending from the outer end of the line 20' to the apex of the rod 22. A cap of solder or other suitable material 27 is formed over the upper ends of the rods 22, 24, 25 and 26 for firmly anchoring the same together.

It should be understood that the lines 20 and 20' are preferably painted or formed of one distinguishing color, whereas the circle 19 is preferably painted or formed of a second distinguishing color, the circle 19 indicating the construction line and the lines 20 and 20' indicating the given line. The rods 22, 24, 25 and 26 indicate conclusions to be proved or the construction lines, these rods being alternately colored to readily allow the same to be distinguished and indicating at the same time that these rods may be either formed as construction lines or lines to be proved, according to the construction of the problem to be demonstrated.

It should be borne in mind that one of the principal objects of the present invention is the development of a means of teaching geometry whereby geometrical figures may be illustrated by using a plane surface and indicating imaginary lines of a geometrical figure by means of strips of thin material such as wire, string, or any other suitable or convenient material.

Where the term "thin material" is employed in the following claims, it should be borne in mind that said term is used in a broad sense indicating any suitable material for illustrating certain imaginary lines of a geometrical figure to be illustrated wherein imaginary lines are employed in a geometrical problem.

It should be understood that any geometrical figure may be formed by using the means illustrated and claimed, although the different designs and shapes of the figures may be changed to produce anywhere from eighty to one hundred different figures. Only two forms have been illustrated in the drawings to indicate the manner of construction and method of arrangement of the different portions of the figures to illustrate any given geometrical figure.

It of course should be understood that any suitable material may be employed in manufacturing these demonstrating figures, without departing from the spirit of the invention.

What I claim is:—

1. An apparatus for facilitating the teaching of geometry comprising a plurality of right angularly extending planes provided with imaginary lines formed thereon, and a thin strip of material secured to one plane and extending at an angle thereto toward the outer edge of a right angularly extending plane and passing through said right angularly extending plane and having its opposite end secured to a right angularly extending plane below said first-mentioned right angularly extending plane said thin strip of material being used to indicate certain angle lines employed in constructing geometrical figures.

2. An apparatus for facilitating the teaching of geometry comprising a body, construction lines formed upon said body, and thin strips of material secured to said body and used in connection with said construction lines for indicating certain angle lines of a geometrical figure.

In testimony whereof I hereunto affix my signature.

JOSEPH O'HARA CARSON.

Copies of this patent may be obtained for five cents each, by addressing the "Commissioner of Patents, Washington, D. C."